Patented Feb. 7, 1950

2,496,852

UNITED STATES PATENT OFFICE 2,496,852

VINYL HALIDE RESINS PLASTICIZED WITH A DIOCTYL TETRACHLOROPHTHALATE

George J. Bohrer, Troy, N. Y., assignor to General Electric Company, a corporation of New York No Drawing. Application January 15, 1946,
Serial No. 641,411

1 Claim. (Cl. 260—31.8)

This invention relates to the production of synthetic rubber-like compositions and more particularly is directed to the preparation of such compositions comprising the product of polymerization of a mass comprising a vinyl halide, specifically vinyl chloride. The invention especially is concerned with a composition of matter comprising (1) the product of polymerization of a polymerizable mass comprising a vinyl halide, and (2) a tetrachlorophthalic diester of an octyl alcohol.

Plasticized compositions made from polymers and copolymers of vinyl halides are well known as substitutes for rubber where special properties are desired, as for example, resistance to acids, alkalis, gasoline, etc. These compositions are also quite useful as electrical insulation, more particularly because of their corrosion resistance and high electrical resistivity. In many cases it is necessary that these plasticized compositions possess outstanding flame-resistance as well as good aging properties. Similar unhalogenated plasticizers, e. g., di-(2-ethylhexyl) phthalate, which have been used for polymers and copolymers of vinyl halides, impart poor flame-resistant and aging characteristics to these resins. Thus, whereas, e. g., polyvinyl chloride resin plasticized with di-(2-ethylhexyl) tetrachlorophthalate does not support combustion and is self-extinguishing, and loses scarcely any of its elongation power when heated at 250° F. for 5 days, in marked contrast, the same polyvinyl chloride resin plasticized with an equivalent amount of di-(2-ethylhexy) phthalate supports combustion and burns at the rate of 0.75 inch per minute, and loses most of its elongation power when heat-aged as above.

Another advantage accruing from the use of plasticizers herein described results from the presence of the chemically bound halogen atoms in the plasticizer. The halogen atoms in the aryl nucleus of the ester increase the molecular weight and boiling point of the ester as compared with otherwise identical non-halogenated esters, thereby decreasing its vapor pressure. This is a matter of great practical significance. It means that a formed plasticized composition (e. g., a molded article or in the form of extruded insulation on a wire or cable) will retain its flexibility and plasticity characteristics over a longer time than otherwise is possible since, apparently, the loss of plasticizer during use of the composition materially is reduced.

It was entirely unobvious and unexpected to find that these new tetrachlorophthalic diesters were compatible with the polymers and copolymers of vinyl halides and could be employed as plasticizers for such resins, since there are high molecular weight chlorinated compounds, similar in structure to the plasticizers employed in this invention which exert little, if any, plasticizing effect on such resins, particularly on polyvinyl chloride. For example, it was found that di-(n-decyl) tetrachlorophthalate was incompatible with polyvinyl chloride and exerted hardly any plasticizing effect on the resin.

A plasticizer heretofore widely used for softening polymers and copolymers of vinyl halides is tricresyl phosphate. Although such plasticized resins yield satisfactory products for most applications, films produced therefrom discolor at elevated temperatures and lose their flexibility. Moreover, at elevated temperatures, such films show little or no strength.

I have discovered that tetrachlorophthalic diesters of an octyl alcohol act as plasticizers for polymers and copolymers of vinyl halides and impart to such compositions a marked stabilizing effect at elevated temperatures. Films or thin sheets prepared from such compositions are clear, almost colorless or of a light amber color, flexible, tough, have considerable elasticity and excellent tensile strength. These novel tetrachlorophthalic diesters are easily compatible with the polymeric vinyl compound making it possible to lessen the milling time, or to use lower milling temperatures, or both, with obvious advantages in compounding the plasticizer with the vinyl halide polymer or copolymer. This increased compatibility of the components also makes possible the introduction of the plasticizer into the monomer or mixture of monomers, or into the partial polymers or copolymers, and initiating or completing the polymerization of the polymerizable compound in the presence of the plasticizer. In this way the costly and time-consuming step of milling the plasticizer with the vinyl halide polymer or copolymer may be entirely eliminated.

Examples of tetrachlorophthalic diesters of an octyl alcohol which may be employed in this invention are di-(n-octyl) tetrachlorophthalate branched chain octyl alcohol diesters, e. g., di-(2 - ethylhexyl) tetrachlorophthalate, di-(1-methylheptyl) tetrachlorophthalate, di-(1,2,2-trimethyl-1-ethylpropyl) tetrachlorophthalate, etc., as well as the many other diesters of tetrachlorophthalic acid employing the numerous isomers of octyl alcohol as the esterifying alcohol. The novel compounds which may be employed as plasticizers in this invention and methods for their preparation are more specifically disclosed and claimed in my copending application Serial No. 641,412, (now U. S. Patent 2,462,601, issued Feb. 22, 1949), filed concurrently herewith and assigned to the same assignee as the present invention.

To show those skilled in the art the manner in which this invention may be practiced, the following examples are given by way of illustration and not by way of limitation:

EXAMPLE 1

*Preparation of di-(2-ethylhexyl) tetrachlorophthalate*

|  | Weight | Mols |
| --- | --- | --- |
|  | *Grams* |  |
| Tetrachlorophthalic anhydride | 572 | 2.0 |
| 2-Ethylhexanol | 676 | 5.2 |
| Para-toluene sulfonic acid | 10 | 0.058 |

The above ingredients were reacted together in a 3-necked flask containing a mechanical stirrer for about 5 hours at 195°–205° C. The vapors produced from the reaction were condensed and passed into a liquid-liquid separator, and provision made to return the upper layer (2-ethylhexanol) to the reaction flask. After this 5-hour heating period, about 50 ml. water had been collected. At this point, a vacuum of about 26–27 inches mercury was applied to the reaction mixture for 15 minutes while applying heat; 245 ml. of distillate (mostly 2-ethylhexanol) and 50 ml. water were obtained. The reaction mixture was cooled and the precipitated crystals were removed by filtration. The oily filtrate was washed with an aqueous 5% sodium carbonate solution at 65–70° C., and then with water at the same temperature. The washed liquor was then heated under vacuum to remove the low-boilers, heated with fuller's earth (5%) at about 200° C. and filtered. The filtrate was dried and distilled to yield di-(2-ethylhexyl) tetrachlorophthalate which boiled at about 210° C. at 0.1 mm. The product had an acid number of less than 2 and a viscosity of 165 centipoises at 25° C. The saponification number of the compound was 211.5 (calculated 212). At 25° C. the refractive index was 1.5130 and the density 1.179.

The following examples illustrate the preparation of plasticized compositions using these tetrachlorophthalic diesters.

EXAMPLE 2

Parts by weight
Gamma polyvinyl chloride _____ 60
Di-(2-ethylhexyl) tetrachlorophthalate _____ 40

The above ingredients were milled together on heated differential mill rolls at approximately 110° C. for about 10 minutes until a clear homogeneous sheet was obtained. This rolled sheet was pressed in a chromium-plated mold for 5 minutes at 150° C. The resulting smooth sheet was quite flexible, clear, and grayish water-white in color. This composition had a tensile strength of about 2503 pounds per square inch and an elongation at the breaking point of 150%. When heated at 125° C. for 3 hours in a circulating oven, the composition lost only only 1% by weight of its plasticizer. The composition when tested for flammability did not support combustion. When di-(2-ethylhexyl) phthalate was employed to plasticize gamma polyvinyl chloride in the same proportions as in the above example, the plasticized composition had a tensile strength of 1629 pounds per square inch, an elongation of 150%, and lost 4.4% by weight of its plasticizer when heated at 125° C. for 3 hours.

EXAMPLE 3

Parts by weight
Gamma polyvinyl chloride _____ 60
Di-(2-ethylhexyl) tetrachlorophthalate _____ 40
Heat-stabilizer, specifically litharge _____ 5

The above ingredients were milled together and pressed as in Example 2. The sheet obtained was flexible, clear, and almost water-white. The composition had a tensile strength of about 2260 pounds per square inch and an elongation of about 245%. When heat-aged for 5 days at 120° C., this percentage elongation decreased only 4%, indicating the excellent stability of this plasticized composition. Other well-known similar plasticizers, under the above-described heat-aging test, showed the following per cent losses in elongation when they were used to plasticize gamma polyvinyl chloride in the same proportions as above and using litharge as a heat-stabilizer:

Plasticizer: Per cent loss elongation
Di-(2-ethylhexyl) azelate _____ 100
Di-(2-ethylhexyl) phthalate _____ 77

EXAMPLE 4

When 60 parts by weight gamma polyvinyl chloride were plasticized with 40 parts by weight di-(n-octyl) tetrachlorophthalate and molded in the same manner as in Example 2, a flexible sheet was obtained which was a little darker in color than the sheet obtained in Example 2.

In addition to the gamma polyvinyl chloride disclosed in the above examples, the tertachlorophthalate diesters used in the examples, as well as other tetrachlorophthalate diesters of an octyl alcohol, may also be employed to plasticize other similar polymers or copolymers, as, for example, the lower molecular weight forms of polyvinyl chloride; polyvinyl iodide, polyvinyl bromide, etc.; polyvinyl halide compositions formed by the conjoint polymerization of a vinyl halide, such as vinyl chloride, and another organic compound copolymerizable therewith, for example, copolymers of vinyl chloride and a vinyl ester of a saturated aliphatic monocarboxylic acid, e. g., vinyl acetate (such vinyl chloride-vinyl acetate copolymers being available under the trade name of Vinylite resins and wherein the vinyl chloride component is present in a preponderant amount), vinyl butyrate, vinyl acetobutyrate, vinyl hexoate; copolymers of vinyl halide and vinylidene halides, specifically vinylidene chloride; copolymers of vinyl halides and vinyl ethers; copolymers of vinyl halides and vinyl ketones; copolymers of vinyl halides and itaconic esters; copolymers of vinyl halides and acrylic and alkacrylic compounds, etc. Further examples of vinyl halide copolymers which may be plasticized with these new plasticizers may be found in D'Alelio Patents 2,378,753, issued June 19, 1945, and 2,299,740, issued October 27, 1942, both patents being assigned to the same assignee as the present invention. The polymers and copolymers of vinyl halides which are plasticized in accordance with the present invention, e. g., gamma polyvinyl chloride, a copolymer of, by weight, from about 80 to 99% vinyl chloride to 1 to 20% of a vinyl ester of a saturated aliphatic monocarboxylic acid, e. g., vinyl acetate, etc., may be prepared by methods now well known in the art.

The plasticizer may be incorporated in the vinyl halide polymer or copolymer by any of the well-known methods. In addition to the milling method disclosed in the above examples, the polymers and copolymers of the vinyl halides may be dissolved in the plasticizer at elevated temperatures. The amount of plasticizer added may vary from about one-quarter to two parts by weight of plasticizer to one part of the polymer or copolymer of the vinyl halide, i. e., the amount of plasticizer employed may vary from about 20 per cent to 66⅔ per cent, by weight, based on the total weight of the resin and plasticizer. In some instances, greater or lesser amounts of plasticizer may be used, depending upon the particular application. Optimum properties are obtained when from one-half to one part by weight of plasticizer is employed to one part of the polymer or copolymer of the vinyl halide, i. e., the preferred amount of plasticizer ranges from about 33⅓ per cent to 50 per cent, by weight, based on the total weight of the plasticizer and resin.

Polyvinyl halide compositions have a tendency to become discolored upon exposure to high temperatures or upon prolonged exposure to light. To prevent this, certain classes of compounds, commonly known as heat- and light-stabilizers, are added to these polyvinyl halide compositions. Among such stabilizers which may be added to the claimed resinous compositions may be mentioned PbO, $Pb_2O_3$, $Pb_3O_4$, as well as other lead compounds including those disclosed and claimed in Safford Patent 2,269,990, issued January 13, 1942, and assigned to the same assignee as the present invention.

Carbon black, barytes, zinc oxide, clay, wood flour, and other pigments and fillers commonly used in the rubber and plastics industries may be included in the compositions.

Other plasticizers commonly used with polyvinyl chloride resins may also be employed with the plasticizers included in my claimed invention. Among these may be mentioned tricresyl phosphate, dibutyl phthalate, dibenzyl sebacate, etc.

What I claim as new and desire to secure by Letters Patent of the United States is:

A strong, flexible film comprising, by weight, 60 parts gamma polyvinyl chloride and 40 parts di-(2-ethylhexyl) tetrachlorophthalate, the said film having a weight loss of only one per cent, by weight, when heated at 125° C. for three hours.

GEORGE J. BOHRER.

REFERENCES CITED

The following references are of record in the file of this patent:

UNITED STATES PATENTS

| Number | Name | Date |
| --- | --- | --- |
| 2,118,017 | Safford | May 17, 1938 |
| 2,398,882 | Clark | Apr. 23, 1946 |
| 2,460,574 | Greshman | Feb. 1, 1949 |

FOREIGN PATENTS

| Number | Country | Date |
| --- | --- | --- |
| 881,970 | France | May 13, 1943 |